US005381202A

United States Patent [19]

Mizuno et al.

[11] Patent Number: 5,381,202

[45] Date of Patent: Jan. 10, 1995

[54] PHOTOGRAPHIC FILM CASSETTE, METHOD OF MANUFACTURING THE SAME, AND PACKAGE FOR THE SAME

[75] Inventors: Kazunori Mizuno; Takuya Arai, both of Kanagawa, Japan

[73] Assignee: Fuji Photo Film Co., Ltd., Kanagawa, Japan

[21] Appl. No.: 47,296

[22] Filed: Apr. 19, 1993

[30] Foreign Application Priority Data

Apr. 17, 1992 [JP] Japan .................................. 4-098136

[51] Int. Cl.$^{6}$ ......................... G03B 17/26; G03B 1/04; B65D 85/66

[52] U.S. Cl. ...................................... 354/275; 206/389

[58] Field of Search ........................ 354/275; 242/71.1; 206/461, 45.34, 316.2, 389, 407, 497

[56] References Cited

U.S. PATENT DOCUMENTS 4,850,488 7/1989 Humbert ............................. 206/459
4,887,110 12/1989 Harvey ................................ 354/275
4,918,471 4/1990 Harling et al. ......................... 354/21
4,964,513 10/1990 Ingram ................................ 206/459
5,020,669 6/1991 Nakagoshi ........................... 206/466
5,083,155 1/1992 Kataoka et al. ...................... 354/275
5,143,215 9/1992 Hartley et al. ....................... 206/333
5,181,671 1/1993 Mizuno ............................. 242/71.1
5,209,352 5/1993 Light et al. ......................... 206/391
5,213,372 5/1993 Kuo ................................. 206/459.5

*Primary Examiner*—Michael L. Gellner
*Assistant Examiner*—Nicholas T. Tuccillo
*Attorney, Agent, or Firm*—Sughrue, Mion, Zinn, Macpeak & Seas

[57] ABSTRACT

A photographic film cassette has a cassette shell and a spool of film contained rotatably therein. The photographic film is completely contained in the cassette shell before use. The photographic film cassette is contained in a box-shaped transparent P case. The P case is then externally packaged. The outer is an opaque card arranged face to face with the passage mouth of the cassette and shrink wrap for retaining the P case on the card. In the improved cassette, the cassette shell is constituted of first and second shell halves respectively formed from resin. In manufacturing the cassette, indication representing general information is printed onto the first shell half. The spool with the photographic film is arranged between the shell halves. The shell halves are attached together while keeping the spool rotatable. Subsequently, the label, having indication representing information related to a particular type of the photographic film, is attached to the cassette.

35 Claims, 8 Drawing Sheets

PHOTOGRAPHIC FILM CASSETTE, METHOD OF MANUFACTURING THE SAME, AND PACKAGE FOR THE SAME

BACKGROUND OF THE INVENTION

1. Field of the Invention

The present invention relates to a photographic film cassette, a method of manufacturing the same, and a package for the same. More particularly, the present invention relates to a photographic film cassette of which a leader of photographic film is exited outward from a cassette shell by rotation of a spool, and a manufacturing method and a package associated with the same.

2. Description of the Related Art 135 (35 mm) photographic film cassettes (hereinafter referred to as a cassette) are widely used. A conventional cassette has a metal cassette shell, which rotatably contains a plastic spool around which a photographic filmstrip (hereinafter referred to as film) is wound. The cassette shell is constituted of a cylinder made of a thin metal sheet and caps fitted on both ends of the cylinder. A leader of the photographic film protrudes from the cassette, even before the photographic film is used. To package this cassette, it is contained in a capfitted cylindrical plastic case called a P case, and overwrapped in a carton for retail sale. The P case is a moisture-proof inner packaging which protects the photographic film from moisture, and is transparent enough for visual detection of the cassette. The carton is used as an outer packaging for protection against ambient light and for printing indications such as the manufacturer's name and the type of the photographic film.

It is also known to utilize a photographic film cassette having a resinous cassette shell, instead of a metal cassette shell, as described in commonly assigned patent application Ser. No. 07/945,592. The cassette shell is constituted of two semi-cylindrical resinous shell halves. The photographic film is positioned so that the leader does not protrude from the cassette shell prior to loading the cassette in a camera. In such a cassette, when a spool is rotated to unwind the photographic film, the leader is caused to move through a passage mouth formed in the cassette shell and thereby exit from the cassette.

The carton described above is discarded after the P case, with the cassette therein, is removed from the carton for use. Although the carton is required for indication and protection, it requires excess materials and thus is wasteful and presents disposal problems. In order to eliminate the carton a P case must protect the cassette from ambient light and thus must be completely opaque, so that the cassette cannot be visually defected from the outside.

Cassettes, which have a resinous cassette shell and of which photographic film is positioned so that the leader does not protrude from the cassette shell prior to use require prevention of ambient light from entering a passage mouth in a more reliable manner than conventional cassettes. Accordingly, conventional cartons are inadequate for protection against ambient light in such resinous cassettes.

SUMMARY OF THE INVENTION

In view of the foregoing, an object of the present invention is to provide a package appropriate for packaging a photographic film cassette wherein the leader does not protrude from the cassette shell prior to loading the cassette in a camera.

Another object of the present invention is to provide a cassette package in which light is reliably prevented from entering a passage mouth of the cassette, while allowing the cassette to be easily detected therein.

A further object of the present invention is to provide a cassette package such that less waste is produced after removing a packaging from the cassette.

Still another object of the present invention is to provide a photographic film cassette manufacturable with high efficiency in view of manufacturing cassettes for different photographic films, and to provide a method of manufacturing the cassette.

An additional object of the present invention is to provide a photographic film cassette wherein the arrangement of indication on the cassette is prevented from affecting the quality of the photographic film, and to provide a method of manufacturing the cassette.

In order to achieve the above and other objects and advantages of this invention, a cassette package has at least one photographic film cassette and a packaging device combined for packaging the photographic film cassette. The photographic film cassette has a spool. Photographic film is wound around the spool in the form of a roll. A cassette shell contains the photographic film, and has a passage mouth formed therein. When the spool is rotated in an unwinding direction in the cassette shell, the leader is advanced to an outside of the cassette shell through the passage mouth. The packaging device has an inner packaging for containing the photographic film cassette. The inner packaging is at least partly transparent. An outer packaging is arranged around the inner packaging for holding the inner packaging and includes an opaque first portion arranged in opposition to the passage mouth of the photographic film cassette.

According to the novel package of the photographic film cassette, ambient light can be reliably prevented from entering a passage mouth of the cassette. Also, the cassette is discernible with great ease even while packaged. When the present invention is applied to a cassette with a resinous cassette shell, information regarding the cassette is also externally visible even as packaged. The novel cassette package is advantageous in packaging a photographic film cassette wherein the leader does not protrude from the cassette shell prior to loading the cassette in a camera. Also, less waste is produced even after removing the packaging from the cassette.

In the photographic film cassette, the cassette shell is constituted of first and second shell halves respectively formed from resin. A label is attached to the first shell half and has an indication representing first information related to the type of the photographic film. An indication is also printed on the second shell half for representing general second information irrespective of the type of the photographic film.

To manufacture the photographic film cassette, the indication representing the general information is printed onto the second shell half. The spool and the photographic film wound on the spool are next arranged between the two shell halves. The two shell halves are attached together while rotatably containing the spool. Then, the label is attached to the cassette.

According to the novel method, the novel cassette can be manufactured with high efficiency, in view of manufacturing cassettes for different photographic films. In manufacturing the cassette, arrangement of the indication on the cassette does not affect the quality of the photographic film.

Irrespective of the present invention, it could be conceived that a P case would have indication of printed information related to a type of the photographic film to be contained. However, a P case embodied by the present invention will require no printed information. In a step of inserting the cassette into the P case, no extra classification of such P cases is needed for each type of photographic film to be contained. In the invention, manufacturing steps are minimized and the packaging operation is easier.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
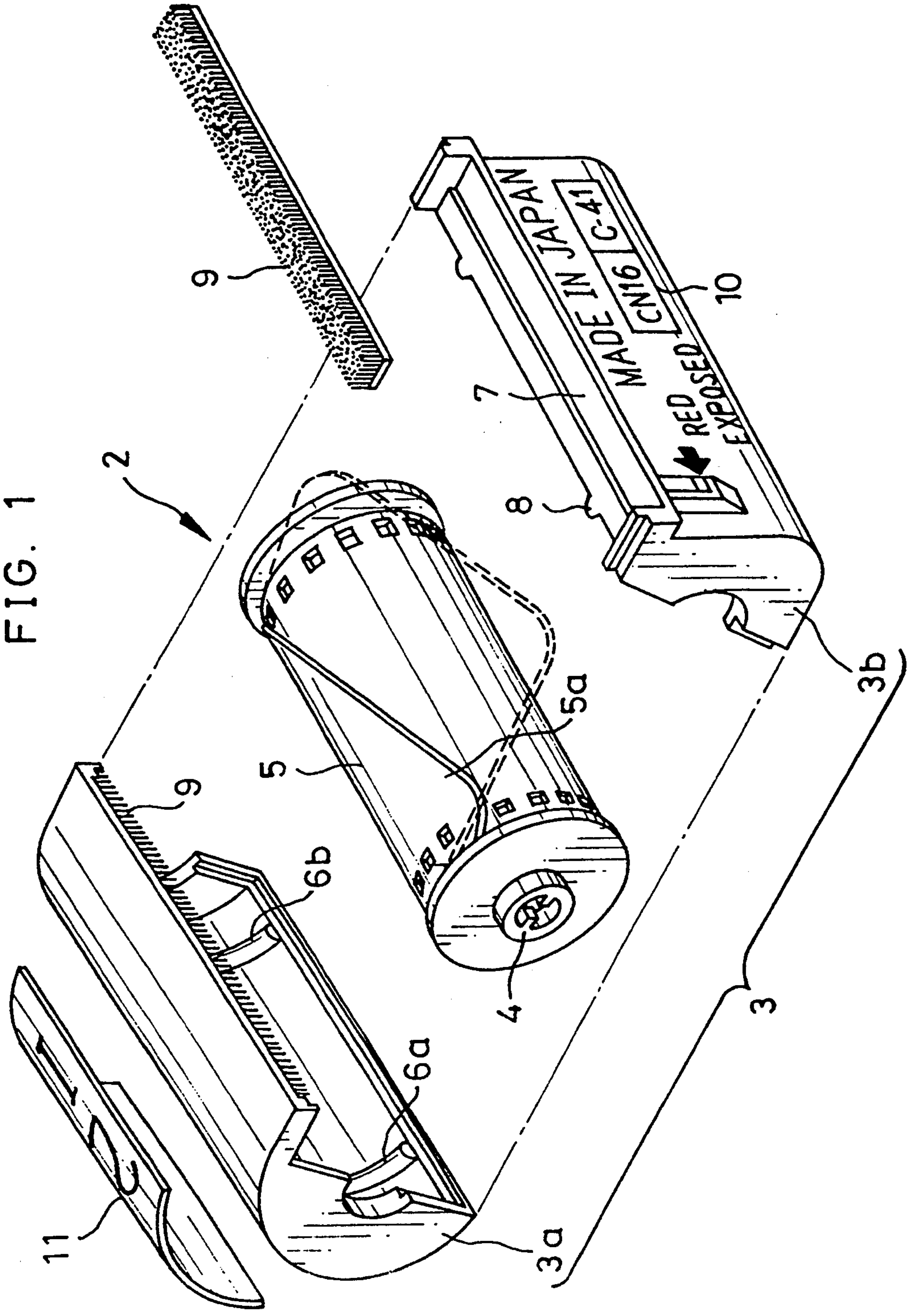
FIG. 1 is an exploded perspective view illustrating a photographic film cassette according to a preferred embodiment.

In FIG. 1, the cassette 2 is generally constituted of a cassette shell 3, a spool 4 and a photographic film 5. The cassette shell 3 consists of a pair of shell halves 3*a* and 3*b*, respectively molded from polystyrene resin, or the like. Photographic film 5 is wound on the spool 4, which is contained in the cassette shell 3. The resin for the shell halves 3*a* and 3*b* is colored in gray to be opaque. The gray color, as compared with black, is favorable, because it absorbs less heat when the cassette shell 3 is subjected to sunlight. Also, printing can be finished more neatly on the gray resin. The inner surface of the shell halves 3*a* and 3*b* are provided with arcuate ridges 6*a* and 6*b*. When the photographic film 5 is completely contained in the cassette shell 3, the ridges 6*a* and 6*b* are in contact with the outermost turn of the roll of the photographic film 5. The one ridge 6*a* is tapered on the side of the lower shell half 3*b* at a throat of the cassette 2, to constitute a separator claw 8, which operates, when the roll of the photographic film 5 is rotated, by engaging and separating a leader 5*a* of the photographic film 5 from the roll of the photographic film 5.

When the cassette 2 is loaded in a camera, a mechanism of the camera rotates the spool 4 clockwise in FIG. 1. The photographic film 5, prevented from loosening by the ridges 6*a* and 6*b*, is rotated clockwise along with the spool 4. The leader 5*a* abuts on the separator claw 8 during rotation, is separated from the roll by the claw 8, and is advanced through a passage mouth 7 to the outside of the cassette shell 3. When all of the photographic film 5 has been used for taking photographs, the entire photographic film 5 is rewound into the cassette shell 3 until the leader 5*a* is once again contained fully in the cassette shell 3. This leader-advancing construction of the cassette 2 is favorable as compared with conventional photographic film cassettes, because the great ease of loading and unloading of the cassette without the need for handling of the leader 5*a* of the photographic film, which protrudes from the passage mouth of conventional cassettes. Plush or light-trapping members 9 are provided for preventing ambient light from entering the cassette shell 3, in a known manner.

A printed indication 10, representing information which does not relate to the type of the photographic film, is disposed on the lower shell half 36. The printed indication 10 may relate to the country of manufacture, the manufacturer, responsibility disclaimers, developing conditions, and indicia for representing the unexposed or exposed condition of the photographic film 5, for example. The developing conditions as such are generally common to color negative films. To print the indication 10, it is preferably to utilize pad printing and hot stamping, by which ink or paint is transferred to the lower shell half 3*b* as literal or symbolic indicia; and thermal transferring and blocking, for which a mold for forming the lower shell hair 3*b* is provided with recessed patterns corresponding to the literal or symbolic indicia.

A label or sticker 11, made of a polystyrene sheet being 0.05 mm thick, is attached to the upper shell half 30. The front face of the label 11 is provided with a printed indication representing information related to the type of photographic film 5. Precisely, the type information may relate to the ISO sensitivity, maximum photographable frames, and negative or positive film type, for example. The type information may indicate if the film is color or monochrome. Also, the type information may be encoded as bar codes or other indicia. The rear face of the label 11 has a coating of an adhesive agent. The base of the label 11 can be made of paper, polymer film, deposited film, and metallic foil, for example. The label 11 is constituted of the base, a printed indication, and a rear coating, which can be an adhesive agent, a sticky adhesive agent, or a delayed tack agent, for example.

Figure 2:
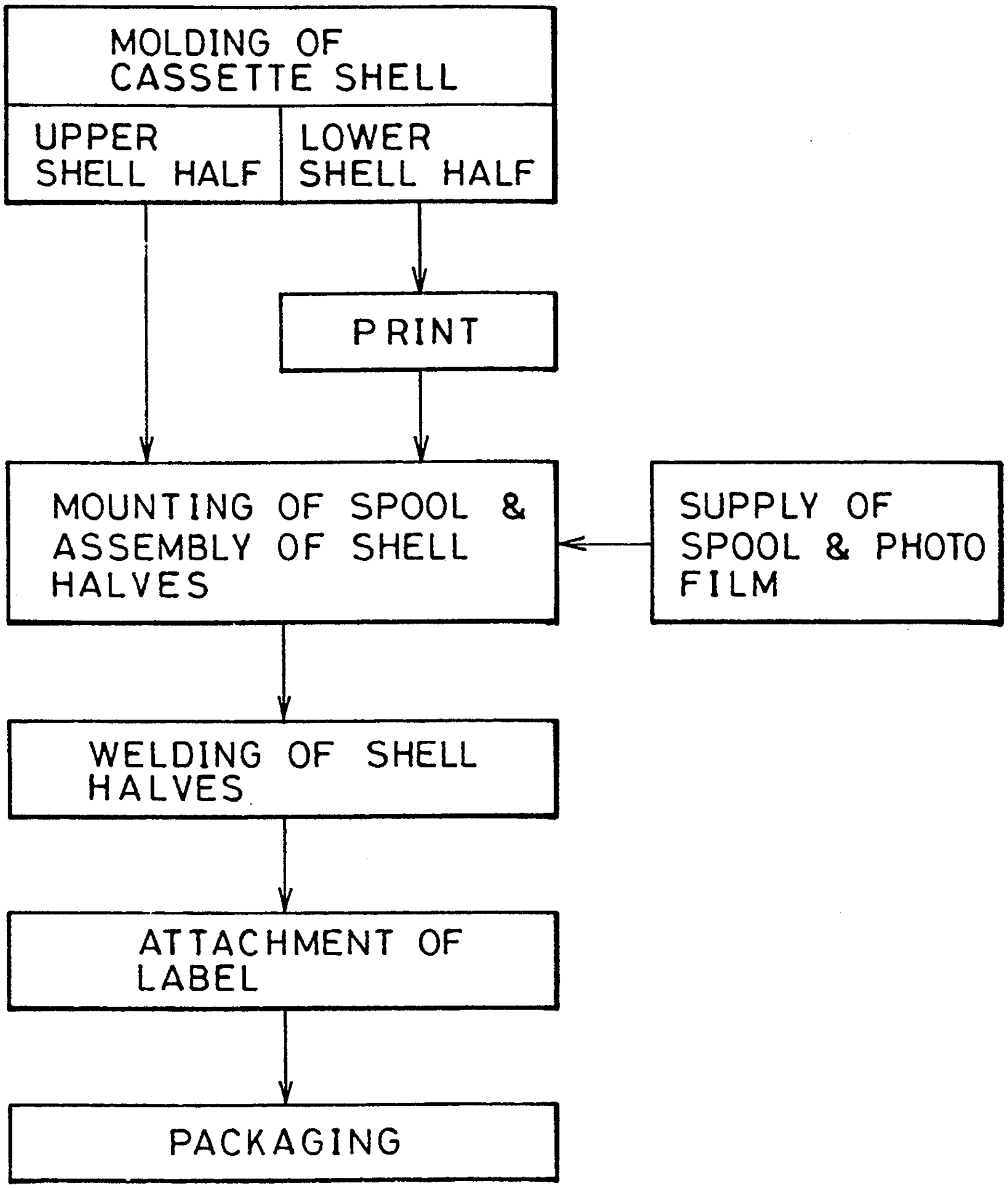
FIG. 2 is a flow chart illustrating a process of assembling the photographic film cassette of FIG. 1.

A process of manufacturing the photographic film cassette 2 is schematically illustrated in FIG. 2. At first, the upper and lower shell halves 3*a* and 3*b* are separately molded. The indication 10 is then printed on the lower shelf half 36. The lower shell half 3*b* is heated during printing, but is not heated to a temperature which would deform the resin of the lower shell half 3*b*. Because the photographic film 5 is not yet mounted in the shell half 3*b*, the photographic film 5 is not affected by the heat applied in printing the indication 10. The indication 10 does not relate to the type of photographic film 5, and thus the lower shell half 3*b* can be manufactured commonly for different types of photographic film even when the indication 10 is printed thereon. This reduces manufacturing steps and parts inventory.

To assemble the shell halves *3a* and *3b* into the cassette shell 3, the spool 4 and the photographic film 5 is first supplied. The photographic film 5 is long enough to accommodate the photographable frames, and is wound around the spool 4. The spool 4 with the photographic film 5 is rotatably supported between the shell halves *3a* and *3b* in bearing holes defined in the cassette shell 2. The shell halves *3a* and *3b* are fitted together and attached by ultrasonic welding. A specific kind of the cassette 2 is then determined according to the photographic film 5 contained therein. The label 11, which relates to the specific kind of film, is then attached to the cassette 2. The label 11 has an adhesive backing and thus heat is not applied to the photographic film 5 or the cassette shell 3 at this time. Because the label 11 indicates information related only to the type of the photographic film 5, the user of the printed indication 10 for all common information reduces the size and cost of the label 11.

Note that the cassette 2 may be assembled by attaching a trailing end of the photographic film 5 to the spool 4, sandwiching the spool 4 between the shell halves *3a* and *3b*, rotating the spool 4 to wind up the photographic film 5 into the cassette shell 3, and then attaching the shell halves *3a* and *3b* to each other. It is also possible to sandwich the spool 4 between the shell halves *3a* and *3b*, attach the shell halves *3a* and *3b* and subsequently rotate the spool 4 to wind up the photographic film 5 into the cassette shell 3.

The cassette 2, as manufactured, then proceeds to the packaging steps. At first, the cassette 2 is contained in an inner packaging. The inner packaging is a resinous P case, formed from transparent polystyrene. The cassette 2, internally packaged in the P case, is packaged externally next. The outer packaging has a construction called a carded packing, which consists of a form including a card or shaped as a card, and is adapted to suspension from a hanger for convenience in public retail display of the cassette 2.

Figure 3:
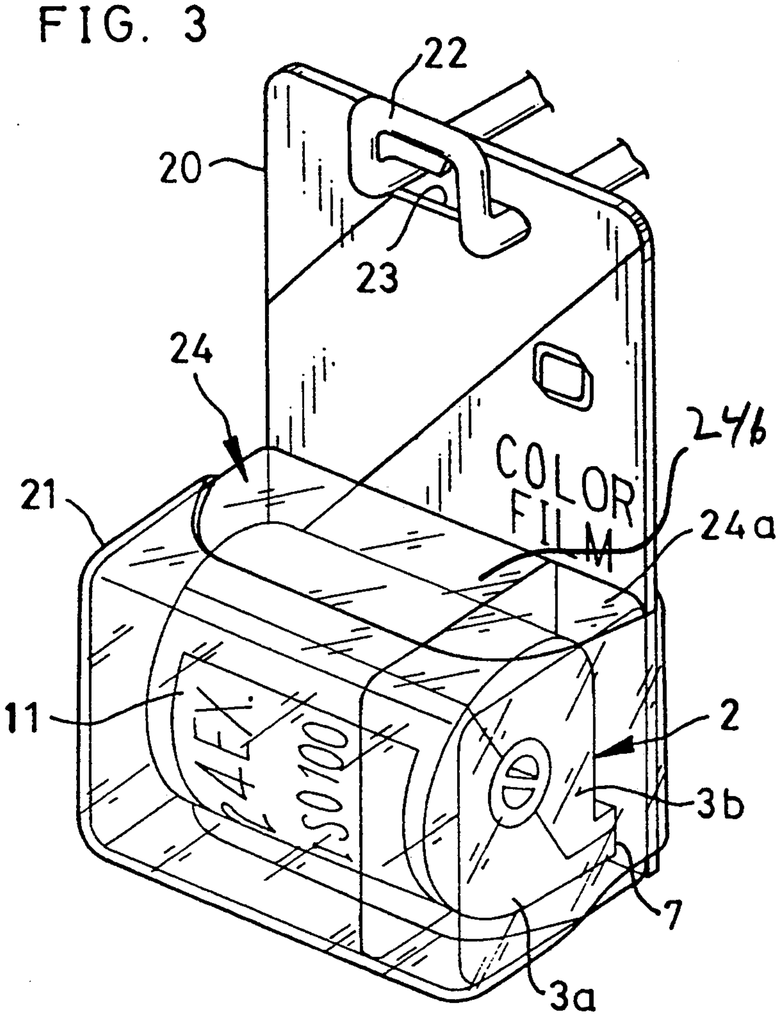
FIG. 3 is a perspective view illustrating a package of the photographic film cassette, containing the cassette of FIG. 1.
Figure 4:
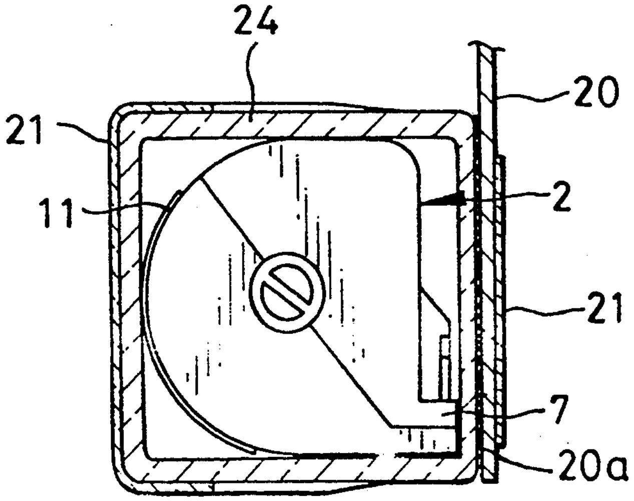
FIG. 4 is a partial cross sectional view, illustrating the structure of the cassette package.

FIGS. 3 and 4 illustrate the carded packing, which consists of an opaque card 20 and a transparent shrink film 21. The card 20 is of a paper sheet having a weight of 150 g/m$^2$ and an optical transmittance density of 1.5 or more, preferably of 2.0 or more, which is sufficient in opacity. The top of the card is provided with a through hole 23 for insertion of a hanger 22 for suspension. The shrink film 21 is of transparent polyethylene, and has a heat-shrinkable characteristic, as is well known in the art. A resinous P case 24 is shaped like a box, and has a cap *24a*, which seals the inside of a body *24b* of the P case 24 in airtight fashion so as to keep the P case 24 moisture-proof. The inside of the P case 24 is of a rectangular shape and is fitted on the cassette 2 as seen in FIG. 4 in cross section, in order to rotationally fix the cassette 2.

The P case 24 containing the cassette 2 is at first attached to the card 20 by use of hot-melt adhesive agent *20a* in a provisional manner, while the passage mouth 7 of the cassette 2 is directed to the card 20, so that the card 20 covers the passage mouth 7. The P case 24 with the card 20 is wound in the shrink film 21, to which heat is applied at a temperature low enough to avoid influence to the photographic film 5 and the cassette shell 3. The heat shrinks the shrink film 21, which wraps and retains the P case 24 and the card 20, so as to externally package the cassette 2 in the carded packing.

The cassette 2, as packaged in the manner above, is transported and displayed at a retail store. The rotational retention of the cassette 2 in the P case 24 and the retention of the P case 24 on the card 20 maintain the passage mouth 7 in a position were it is covered by the card 20. Even if exposed to strong sunshine for a long time, ambient-light will not enter the cassette shell 3 through the passage mouth 7, so that the photographic film 5 is safely and reliably prevented from being exposed to ambient light.

When the cassette 2 is displayed at retail, the label 11 can be seen through the shrink film 21 and the P case 24 so that the indication on the label 11 is easily discernible. It is thus possible to print only decorative patterns on the surface of the card 20 while still informing the customer of necessary information. The card 20 is favorable for printing decorative patterns or commercial information, because the single face thereof is larger than one face of a conventional packaging of a paper box, and because the card 20 has also a somewhat large rear face where information is printable. For example, it is possible to easily print, on the back of the card 20, indication that the cassette as packaged is constructed such that rotation of the spool 4 causes the photographic film 5 to advance to the outside of the cassette 2. The transparency of the shrink film 21 and the P case 24 is favorable in view of protection of the cassette 2 from high temperature because transparent articles do not absorb as much energy as colored material, even when light is directed thereon. Note that the shrink film 21 may be a heat-radiation absorbing film.

Figure 5:
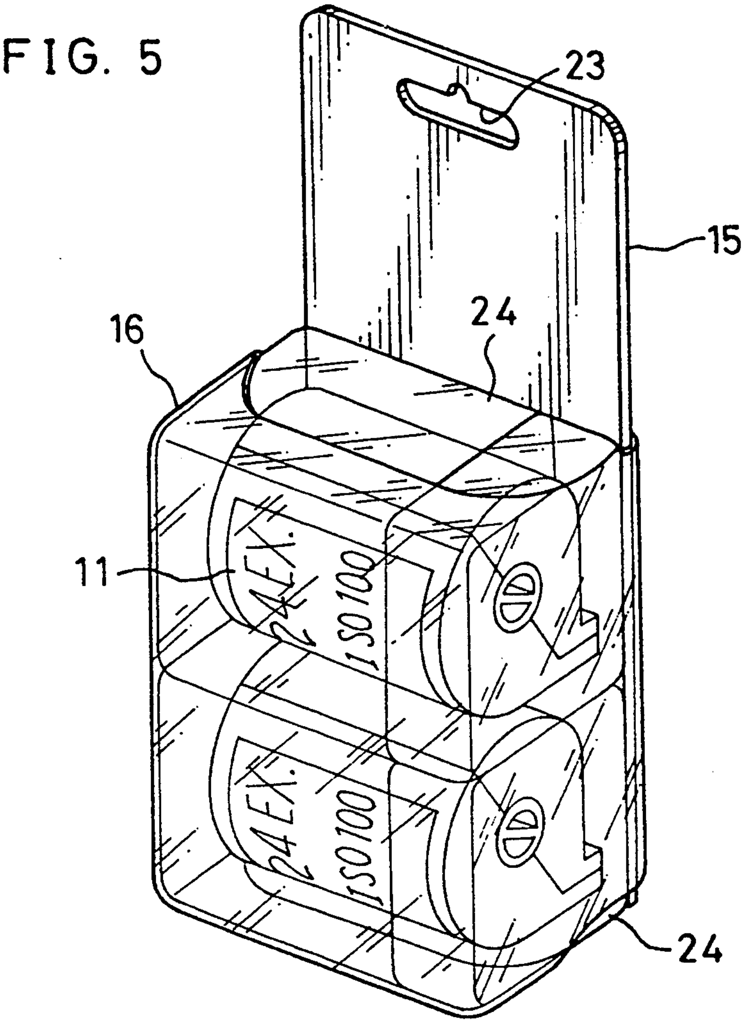
FIG. 5 is a perspective view illustrating a variant cassette package containing two cassettes.

FIG. 5 illustrates an embodiment in which the two P cases 24 are mounted on an opaque card 15 and wrapped in a transparent shrink film 16. Materials for the card 15 and the shrink film 16 are similar to the former embodiment.

Figure 6:
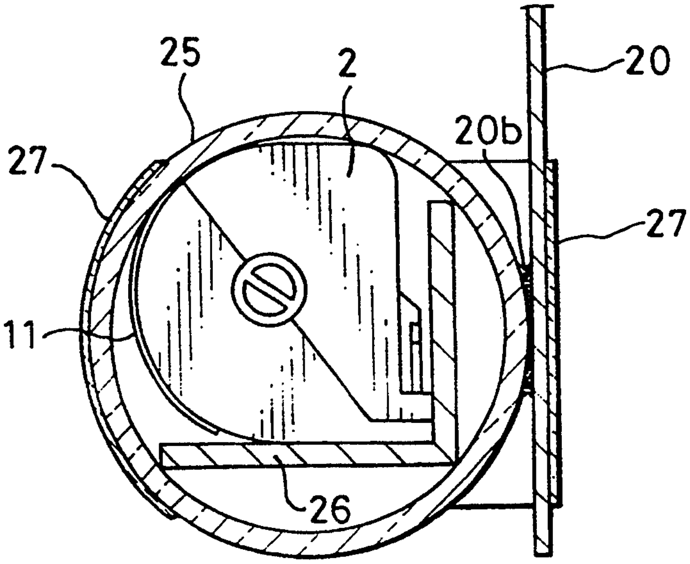
FIG. 6 is a perspective view illustrating another preferred cassette package of which a P case is cylindrical.

FIG. 6 illustrates a carded packing for use with a cylindrical P case 25. To position the cassette 2 inside the cylindrical P case 25, an L-shaped stopper 26 is inserted in the P case 25 to prevent the cassette 2 from rotating in the P case 25. The stopper 26 may be formed integrally with the P case 25 or as a separate insertable member. The P case 25 containing the cassette 2 is first attached to the card 20 by use of a hot-melt adhesive agent *20b* in a provisional manner, while the passage mouth 7 is directed to the stopper 26 so as to be covered by the stopper 26. The P case 25 with the card 20 is then wrapped in and retained by a transparent shrink film 27. When the cassette 2 is displayed at a retail store, the label 11 can be seen through the shrink film 27 and the P case 25. The stopper 26 preferably has sufficient opacity to shield the passage mouth 7 from ambient light, so as to give the packaging structure better protection against unwanted exposure to ambient light. Although the P case 25 is cylindrical, unification with the card 20 prevents it from rolling inadvertently during transportation or display.

Figure 7:
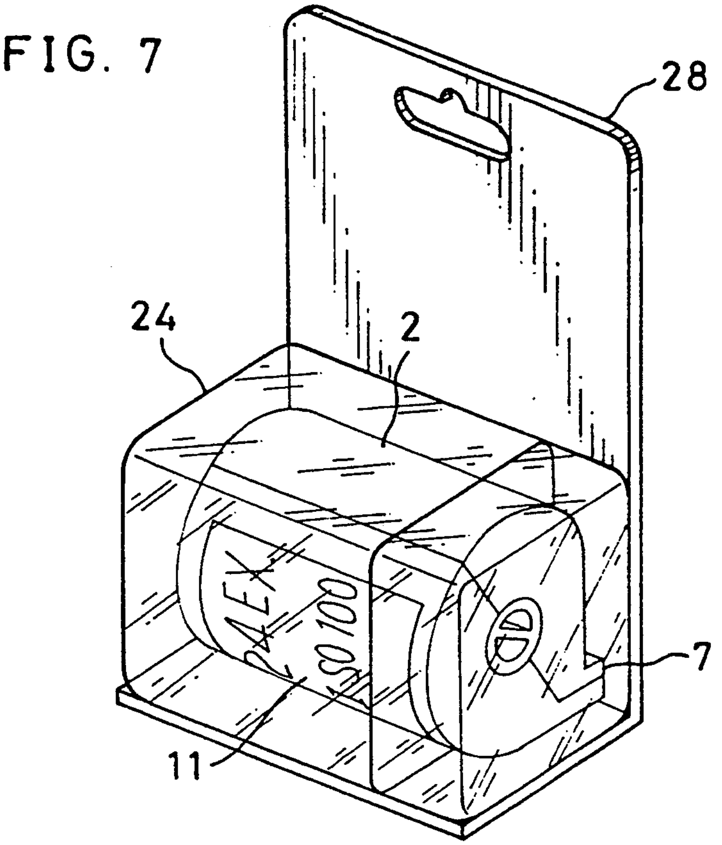
FIGS. 7 and 8 are perspective views illustrating further preferred cassette packages having a folded card.
Figure 8:
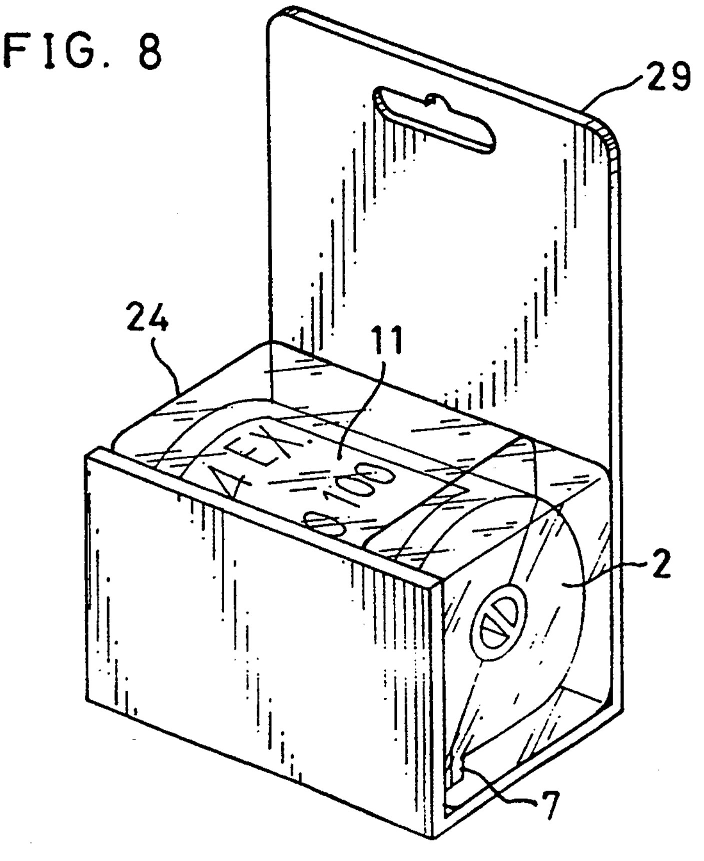

FIGS. 7 and 8 illustrate a packaging structure having a longer card. In FIG. 7, an opaque card 28 is folded in an L-shaped, and attached to the rear and bottom faces of the P case 24 by use of an olefin-type hot-melt adhesive agent, or the like. In FIG. 8, an opaque card 29 is folded along two sides so as to form a J-shape, and is attached to the rear, bottom and front faces of the P case 24 while the passage mouth 7 is directed to the bottom. The material for the cards 28 and 29 is similar to that of the card 20. The shrink film 21 can be eliminated in this embodiment, as attachment of the card 28 or 29 is adequate for unification with the P case 24. Double folding of the card 29 is favorable because it offers further protection of the passage mouth 7 from ambient light.

Further, an opaque card of a novel packaging structure may be folded three times to cover the four longitudinal faces of the P case 24. Because recognition of an information label requires openness of the face for the label, one end face of the cassette 2 is designated for attachment of the label when the opaque card covers the four longitudinal faces. Also, the two P cases can be packaged with a card folded one or more times in a vertically superposed manner similar to the device illustrated in FIG. 5.

Figure 9:
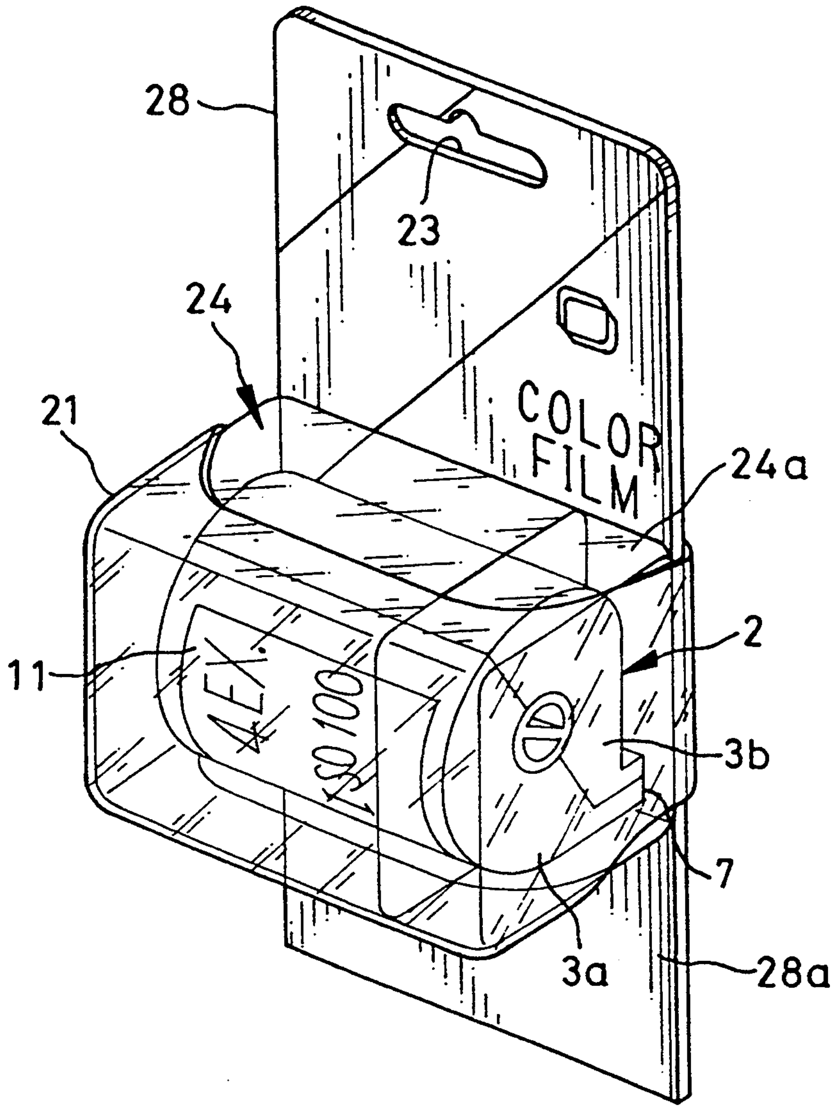
FIG. 9 is an explanatory view, in perspective, illustrating still another preferred cassette package, in a halfway packaged state.

The P case 24 in FIGS. 7 and 9 is directly attached to the card 28 or 29. Alternatively, the card 28 or 29 may be accompanied by the shrink film 21 while attached to the P case 24. A state in producing this is illustrated in FIG. 9. The P case 24 containing the cassette 2 is at first attached to the card 28 with a hot-melt adhesive agent, or the like, in a provisional manner. A bottom portion 28*a* of the card 28 remains unattached under the P case 24. The P case 24 with the card 28 is wrapped in the shrink film 21 so as to assume the state as depicted in FIG. 9. The bottom portion 28*a* is then folded in an L-shape, and is attached to the bottom of the P case 24 with an adhesive agent to assume the form illustrated in FIG. 7.

When the longer card 29 is used and folded twice, the P case 24 can be similarly wrapped in the shrink film 21. The card 29 is then folded, and attached to the P case 24 in the J-shape as illustrated in FIG. 8.

Figure 10:
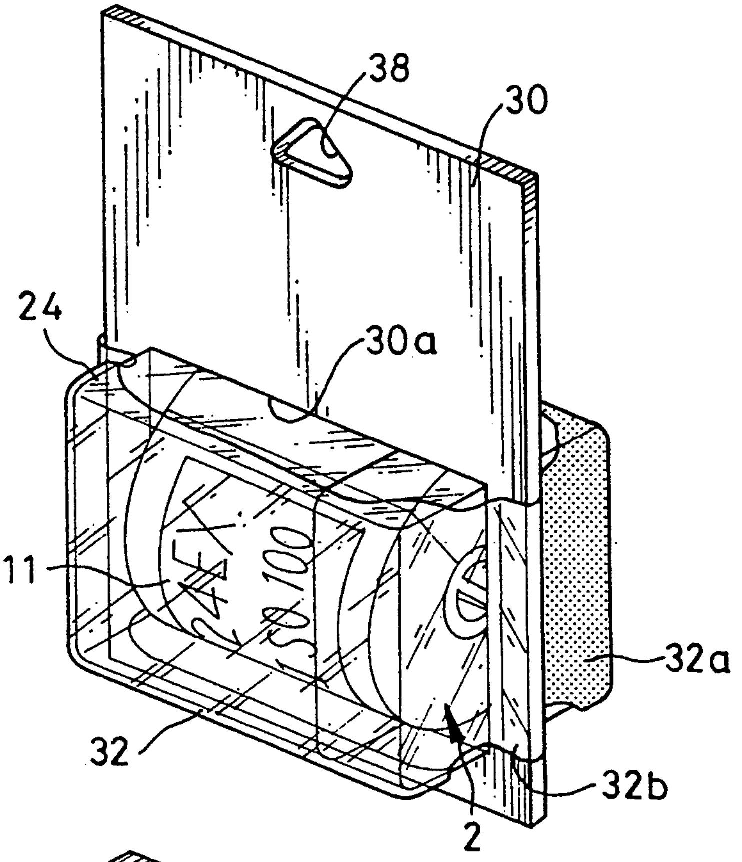
FIGS. 10 and 11 are perspective views illustrating additional preferred cassette packages having a card with an opening.

In an embodiment illustrated in FIG. 10, a card 30 has an opening 30*a*, into which the P case 24 is inserted in the horizontal orientation. The P case 24 with the card 30 is wrapped in a shrink film 32 to attach the P case 24 to the card 30. The card 30 is preferably made of a paper sheet having a weight of 180 g/m$^2$. The passage mouth 7 of the cassette 2 is directed to the rear of the card 30. The shrink film 32 has a rear opaque section 32*a*, colored black by an antecedent printing process, and a front transparent section 32*b*. The opaque section 32*a* has an optical transmittance density of 1.5 or more, preferably of 2.0 or more, which is sufficient for preventing ambient light from entering the passage mouth 7. A through hole 38 is formed in card 30 for suspension during display.

Figure 11:
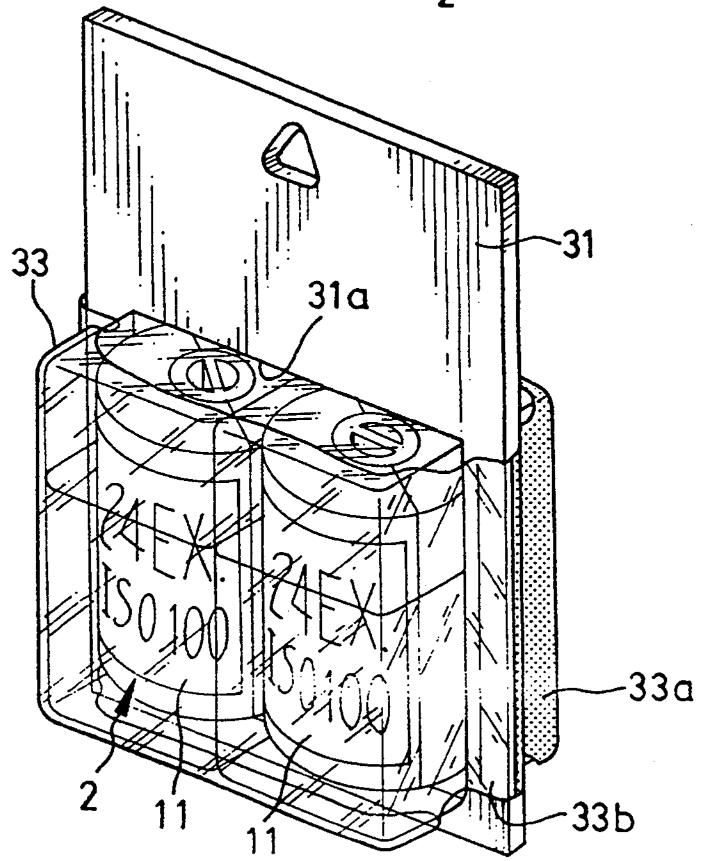

In the embodiment illustrated in FIG. 11, a card 31 has an opening 31*a*. A shrink film 33 wraps the two P cases 24 and encloses them in the card 31, which is of the same material as the card 30. The passage mouth 7 of each cassette 2 is directed to the rear. The shrink film 33 has a rear opaque section 33*a* and a front transparent section 33*b*. The opaque section 33*a* is opaque enough for preventing ambient light from entering the passage mouth 7.

In accordance with the embodiments of FIGS. 10 and 11, the label 11 is also visible externally. The passage mouth 7 is reliably protected by the opaque sections 32*a* and 33*a* from ambient light. Note that, instead of the partly opaque shrink films 32 and 33, it is possible to use an all transparent shrink film with an opaque piece of paper, or the like, arranged between the P case 24 and the rear half of a shrink film. It is also preferable to provide the edges of the opening 30*a* or 31*a* with flaps which are bendable along the edges, and to attach the P cases 24 to the flaps with hot-melt adhesive agent, or the like, for provisional adhesion before wrapping.

Figure 12:
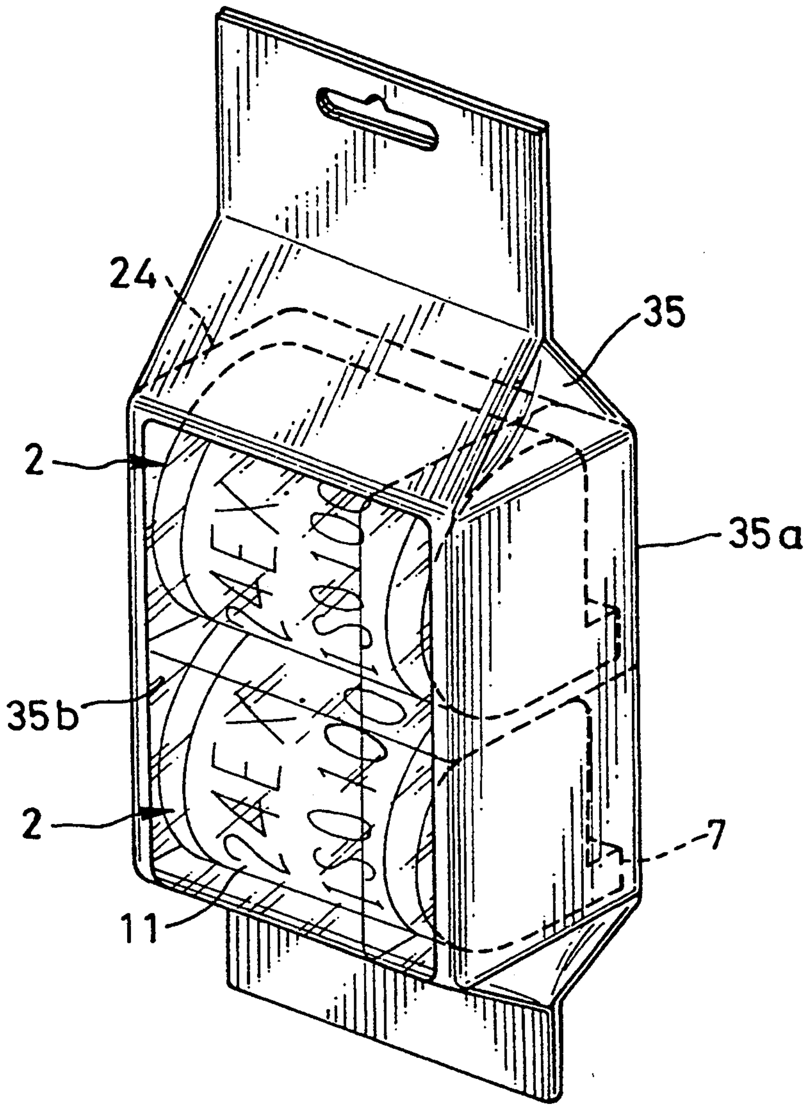
FIG. 12 is a perspective view illustrating another preferred cassette package having a gusseted bag.

FIG. 12 illustrates a packaging structure having a gusseted bag 35, which is formed of a sheet constituted of a base of polyethylene film and a deposited layer of silicon dioxide for imparting a highly moisture-proof characteristics. This moisture-proof sheet is folded into the gusseted bag 35 which encloses the two P cases 24 in a form of pillow type packaging. An opaque bag section 35*a* is printed on the moisture-proof sheet, and has an optical transmittance density of 1.5 or more, preferably of 2.0 or more. The front of the gusseted bag 35 has window section 35*b* which is transparent. The passage mouth 7 is directed t the rear, so that the label 11 is directed to the front and discernible through the window 35*b*. The passage mouth 7 is reliably protected from ambient light by the opaque bag section 35*a*. Note that, instead of the partly opaque gusseted bag 35, it is possible to use a transparent gusseted bag with an opaque piece of paper, or the like, arranged between the P cases 24 and the rear half of a gusseted bag. A gusseted bag can also enclose a single P case, instead of a plurality of P cases. Also, the cylindrical P cases 25 may be enclosed in a gusseted bag, instead of the box-shaped P cases 24.

In the embodiments described above, the P cases are all transparent. Alternatively, a P case may be partly transparent, in other words, may have an opaque portion to receive the passage mouth of the photographic film cassette, so as to have a better light-shielding performance.

Although the present invention has been fully described by way of the preferred embodiments thereof with reference to the accompanying drawings, various changes and modifications will be apparent to those having skill in the art. Therefore, unless otherwise these changes and modifications depart from the scope of the present invention, as defined by the appended claims, they should be construed as included therein.

What is claimed is:

1. A cassette package including at least one photographic film cassette and packaging means for packaging said photographic film cassette;
   - said photographic film cassette comprising:
     - a spool;
     - photographic film wound around said spool in a form of a roll; and
     - a cassette shell for containing said photographic film, said cassette shell having a passage mouth formed therein, said photographic film being entirely contained in said cassette shell before use;
   - said packaging means comprising:
     - an inner packaging for containing said photographic film cassette in a rotationally fixed fashion, said inner packaging having at least portions thereof which are transparent; and
     - an outer packaging arranged around said inner packaging for holding said inner packaging in a rotationally fixed fashion, said outer packaging including an opaque first portion arranged in opposition to said passage mouth of said photographic film cassette.

2. A cassette package as defined in claim 1, wherein said cassette shell is constituted of a pair of shell halves formed from resin.

3. A cassette package as defined in claim 2, wherein said outer packaging has a through hole formed therein, said through hole adapted to insertion of a hanger support device for public display.

4. A cassette package as defined in claim 3, wherein said photographic film cassette further comprises a first visible indication arranged on an exterior of said cassette shell.

5. A cassette package as defined in claim 4, wherein said first visible indication represents information related to a type of said photographic film and is arranged on a face of said cassette shell which is opposite to said passage mouth.

6. A cassette package as defined in claim 5, wherein said first visible indication is a label attached to said cassette shell.

7. A cassette package as defined in claim 6, wherein a second visible indication is printed on a face of said cassette shell which is associated with said passage mouth and represents general information which is not related to the type of said photographic film.

8. A cassette package as defined in claim 7, wherein said inner packaging includes a transparent casing having one open face and a cap for closing said open face.

9. A cassette package as defined in claim 8, wherein said outer packaging is tubular and has two ends which are flattened to be closed.

10. A cassette package as defined in claim 8, wherein said first portion is a sheet.

11. A cassette package as defined in claim 10, wherein an adhesive agent is disposed between said inner packaging and said sheet.

12. A cassette package as defined in claim 11, wherein said inner packaging has substantially a box shape, and said sheet is folded substantially in an L-shape and covers two faces of said inner packaging.

13. A cassette package as defined in claim 11, wherein said inner packaging has substantially a box shape, and said sheet is folded substantially in a J-shape and covers three faces of said inner packaging.

14. A cassette package as defined in claim 8, wherein said outer packaging includes a sheet, having said first portion and said through hole, and a transparent shrink wrap disposed around said inner packaging and said sheet for attaching said inner packaging to said sheet.

15. A cassette package as defined in claim 14, wherein said inner packaging has a box shape, an adhesive being disposed between one face of said inner packaging and said sheet.

16. A cassette package as defined in claim 14, wherein said inner packaging has a round shape, a circumferential surface of said inner packaging being attached to said sheet.

17. A cassette package as defined in claim 14, wherein said sheet has an opening formed therein in which said inner packaging is inserted, and said shrink wrap is wound around said sheet so as to maintain said inner packaging in said opening.

18. A cassette package as defined in claim 17, wherein said inner packaging is horizontally oriented in said opening.

19. A cassette package as defined in claim 17, wherein said inner packaging is vertically oriented in said opening.

20. A cassette package as defined in claim 4, wherein said inner packaging includes a transparent casing having one open face and a transparent cap for closing said open face.

21. A cassette package as defined in claim 20, wherein said outer packaging includes a sheet having said first portion and said through hole, and a transparent shrink wrap disposed around said inner packaging and said sheet for attaching said inner packaging to said sheet.

22. A cassette package as defined in claim 21, wherein an adhesive agent is disposed between said inner packaging and salad sheet.

23. A cassette package as defined in claim 22, wherein said shrink wrap extends in a direction along a length of said inner packaging, and is wound around said inner packaging and said sheet.

24. A cassette package as defined in claim 23, wherein said inner packaging is cylindrical, and a stopper member is arranged in said inner packaging so as to be engaged with said photographic film cassette and prevent said photographic film cassette from rotating with respect to said inner packaging.

25. A cassette package as defined in claim 23, wherein said sheet further includes an extension formed by extending beyond a width of said inner packaging, said extension being folded along at least one side of said inner packaging so as to lay on at least one lateral face of said inner packaging.

26. A cassette package as defined in claim 23, wherein said inner packaging has substantially a box shape, and at least four inside faces of said inner packaging come in contact with said photographic film cassette so as to position said photographic film cassette.

27. A cassette package as defined in claim 26, wherein said outer packaging supports a plurality of inner packagings.

28. A cassette package as defined in claim 4, wherein said inner packaging has substantially a box shape and said outer packaging further includes:

a sheet having an opening formed therein adapted to receive said inner packaging; and a shrink wrap for wrapping said inner packaging, inserted in said opening, so as to retain said inner packaging on said sheet, said shrink wrap having a transparent section which covers said first visible indication so that said first visible indication is visible in front of said sheet, and an opaque section constituting said first portion which is behind said sheet.

29. A cassette package as defined in claim 28, wherein said inner packaging is horizontally oriented in said opening.

30. A cassette package as defined in claim 28, wherein a plurality of inner packagings are inserted in said opening in said sheet.

31. A cassette package as, defined in claim 30, wherein said inner packaging is vertically oriented in said opening.

32. A cassette package as defined in claim 4, wherein said outer packaging is a gusseted bag for containing said inner packaging, said gusseted bag including an opaque section constituting said first portion and having said through hole, and a transparent window section surrounded by said opaque section, said window portion covering said first visible indication so that said first visible indication is visible from an exterior of said gusseted bag.

33. A cassette package as defined in claim 32, wherein said inner packaging is enclosed in said gusseted bag in fashion of a pillow type packaging.

34. A cassette package as defined in claim 33, wherein said inner packaging is inserted into said gusseted bag in a direction of a width of said inner packaging.

35. A cassette package as defined in claim 34, wherein said gusseted bag contains a plurality of inner packagings.

* * * * *